U S010852775B1

(12) United States Patent
Kim et al.

(10) Patent No.: US 10,852,775 B1
(45) Date of Patent: Dec. 1, 2020

(54) COMPUTING DEVICE WITH MOVING DISPLAY

(71) Applicant: NVIDIA Corporation, San Jose, CA (US)

(72) Inventors: Harrison Snagwha Kim, Morgan Hill, CA (US); Jin Hyup Lee, San Jose, CA (US); Younseok Sung, San Jose, CA (US); Yunseok Kim, Pleasanton, CA (US); Jeongyong Jeon, Irvine, CA (US); Seungkug Park, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/555,559

(22) Filed: Aug. 29, 2019

(51) Int. Cl.
*G06F 1/16* (2006.01)
*F16H 21/50* (2006.01)
*E05D 3/02* (2006.01)

(52) U.S. Cl.
CPC .............. *G06F 1/1681* (2013.01); *E05D 3/02* (2013.01); *F16H 21/50* (2013.01); *G06F 1/1616* (2013.01); *G06F 1/1637* (2013.01); *E05Y 2900/606* (2013.01)

(58) Field of Classification Search
None
See application file for complete search history.

(56) References Cited

U.S. PATENT DOCUMENTS

| | | | | | |
|---|---|---|---|---|---|
| 5,880,929 | A | * | 3/1999 | Bhatia | G06F 1/203 165/104.33 |
| 5,946,187 | A | * | 8/1999 | Cipolla | G06F 1/203 16/371 |
| 6,212,069 | B1 | * | 4/2001 | Janik | G06F 1/1616 165/86 |
| 6,714,403 | B2 | * | 3/2004 | Furuki | G06F 3/0221 345/168 |
| 7,447,003 | B2 | * | 11/2008 | Yang | G06F 1/1616 361/679.01 |
| 9,104,382 | B2 | * | 8/2015 | Chen | G06F 1/1681 |
| 9,740,253 | B2 | * | 8/2017 | Cheng | G06F 1/203 |
| 2006/0139862 | A1 | * | 6/2006 | Wang | G06F 1/1641 361/679.3 |
| 2011/0023272 | A1 | * | 2/2011 | Huang | E05D 11/087 16/362 |
| 2018/0329464 | A1 | * | 11/2018 | Lin | G06F 1/203 |

* cited by examiner

*Primary Examiner* — Courtney L Smith
*Assistant Examiner* — Rashen E Morrison
(74) *Attorney, Agent, or Firm* — Shook, Hardy & Bacon L.L.P.

(57) ABSTRACT

In various examples, a portable computing device is provided that has a bottom shell and a top shell pivotally coupled to the bottom shell for movement between a closed position and at least one open position. A display fits within a perimeter rim of the top shell, the display being obscured from view when the top shell is in the closed position and being viewable when the top shell is in the at least one open position. A coupling linkage couples the display, the top shell, and the bottom shell, to move the display between at least a first position with the display closer to the top shell when the top shell is in the closed position and a second position with at least a portion of the display farther from the top shell when the top shell is in the open position.

20 Claims, 12 Drawing Sheets

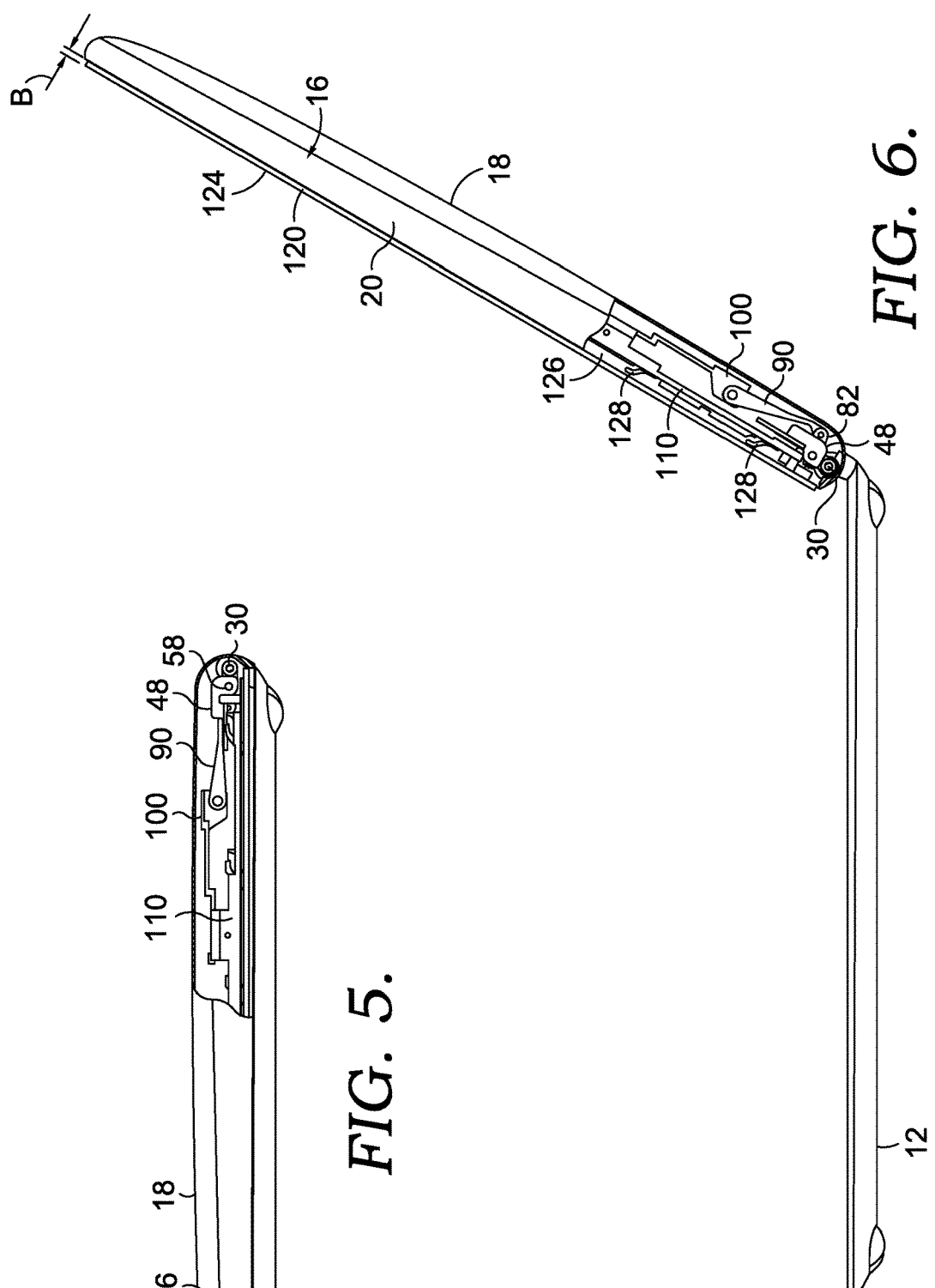

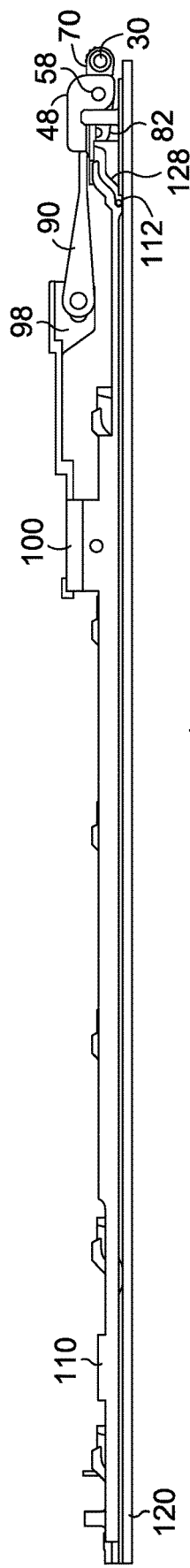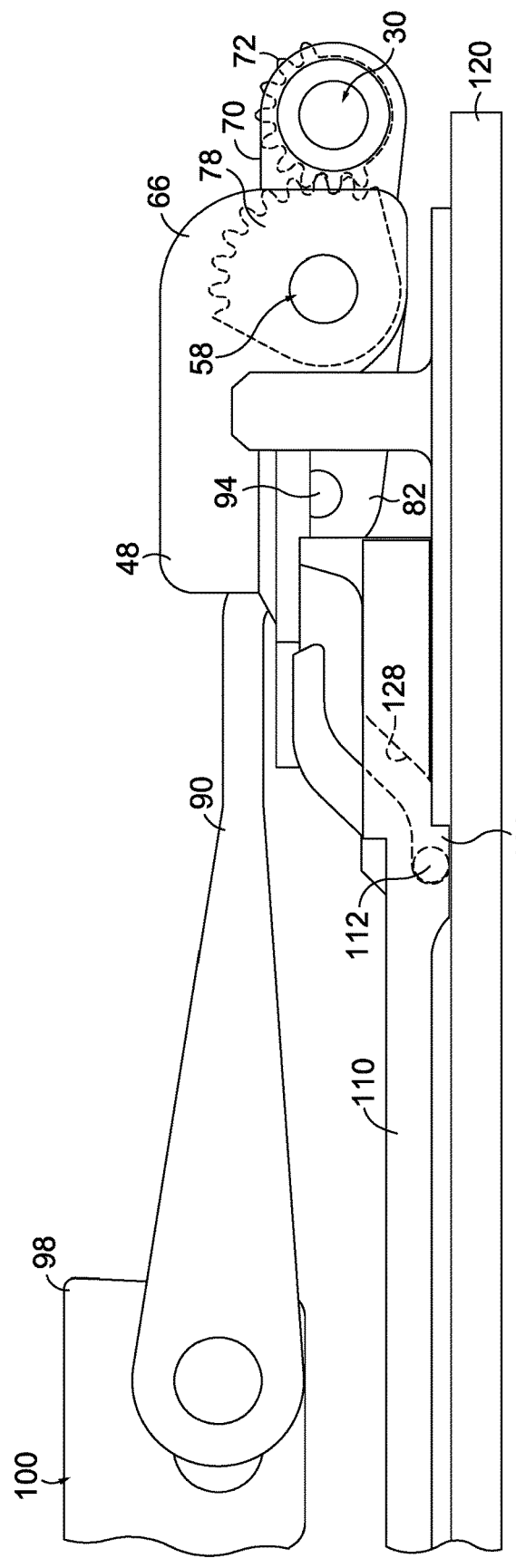

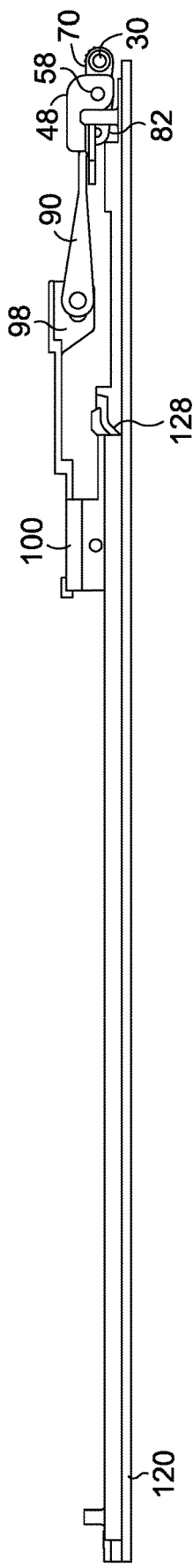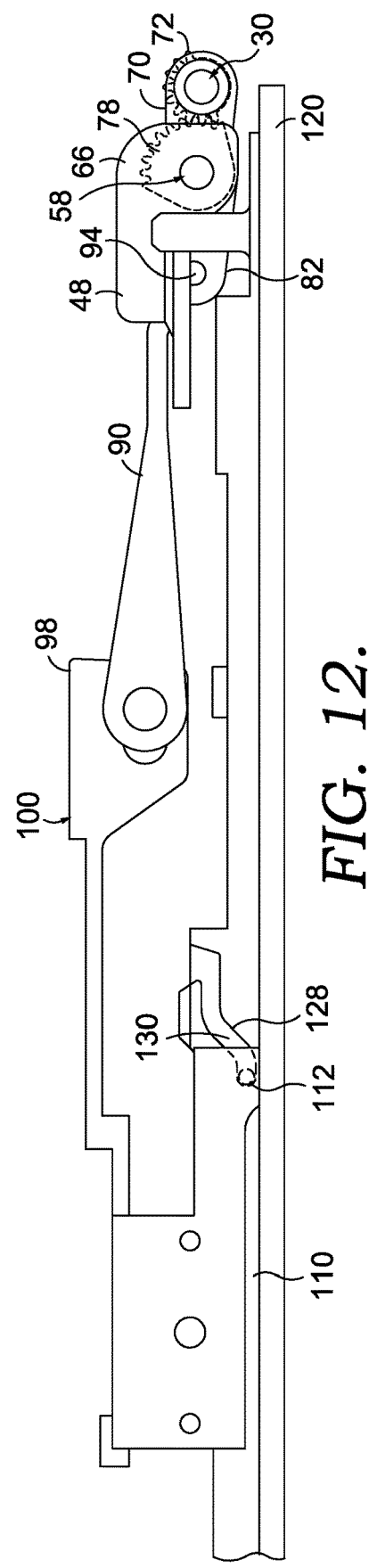

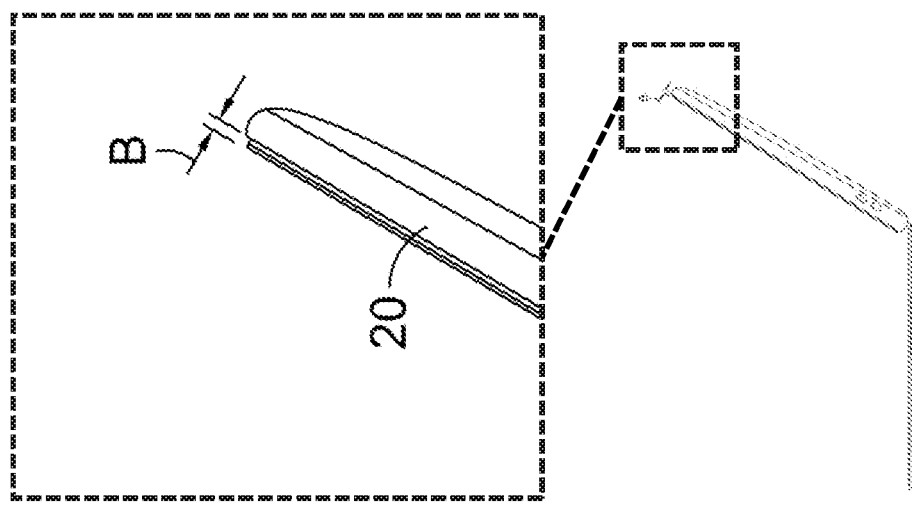
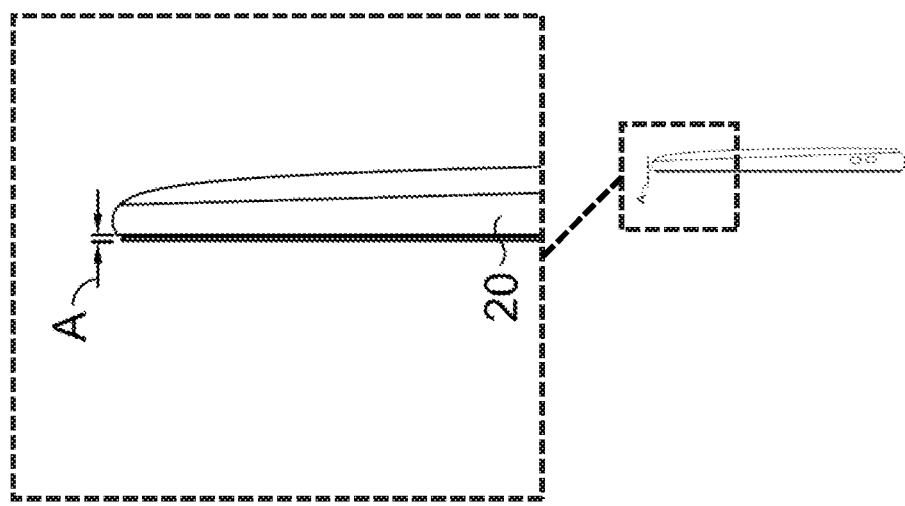
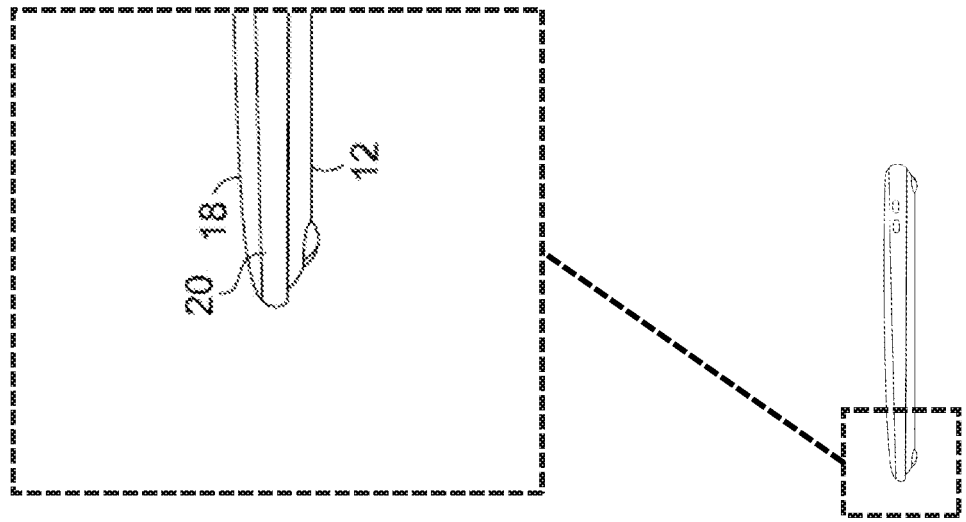
FIG. 22.

COMPUTING DEVICE WITH MOVING DISPLAY

BACKGROUND

Current portable computers, sometimes referred to as "laptops", is typically constructed as a clamshell with a bottom shell and a top shell. The bottom shell typically contains various components such as processors and circuitry, air movement devices such as fans for cooling, and input/output devices such a keyboard and a trackpad. The top shell of such laptops is typically coupled to the bottom shell (e.g., with a hinge, or other coupling mechanism), and may contain a display for viewing and/or interaction by a user. In some laptop designs, the top shell may also contain at least some necessary processing components for the device, including, for example, processors and circuitry. However, these processing components often generate heat, which can damage the display. Some conventional designs dissipate heat by placing a heat insulation layer between the thermal generating components and the display, while other conventional designs incorporate a reserve air gap between the thermal generating components and the display. However, in order to incorporate these heat dissipation components into the laptop design, the overall thickness and weight of the top shell—and thus of the laptop as a whole—are increased, thereby reducing the portability and desirability of the product as consumers continue to favor thinner, lighter laptop designs.

SUMMARY

Embodiments of the present disclosure relate to a portable computing device, such as a laptop, with a moving display. More specifically, a portable computing device is provided that has a bottom shell and a top shell that is pivotally coupled to the bottom shell for movement between a closed position and an open position. A display fits within a perimeter rim of the top shell—the display being obscured from view when the top shell is in the closed position and being viewable when the top shell is in the open position. A coupling linkage couples the display, the top shell, and the bottom shell. The coupling linkage moves the display between at least a first position and a second position. In the first position, when the top shell is in the closed position, the display is close to the top shell (or closer to the top shell relative to when in the second position). In the second position, when the top shell is in the open position, at least a portion of the display is moved farther from the top shell than in the first position. The second position provides an air gap between the display and at least one heat generating component in the top shell.

As such, and in contrast to conventional laptop configurations, such as those described above, the portable computing device described herein moves the display away from the heat generating components as the device is opened. This separation creates a ventilation gap between the display and the top shell of the portable computing device to protect the display from the at least one heat generating component in the top shell during operation. In addition, because the display moves closer to the top shell when in the first, closed position, the resulting design is thinner and more portable as compared to conventional laptop designs. As such, the portable computing device of the present disclosure provides effective, efficient heat dissipation away from the display while in the second, open position, and provides a slim, portable design while in the first, closed position.

BRIEF DESCRIPTION OF THE DRAWINGS

The present system for a portable computing device with a moving display is described in detail below with reference to the attached drawing figures, wherein:

FIG. 5 is a view similar to FIG. 2, but with certain parts being broken away to show details of construction;

FIG. 6 is a view similar to FIG. 4, but with certain parts being broken away to show details of construction;

FIG. 7 is a view of selected components of a coupling linkage, showing the position of the components when the portable computing device is in the closed position of FIG. 2;

FIG. 8 is an enlarged, partial cross-sectional view of selected components of the coupling linkage of FIG. 7, showing the position of the components when the portable computing device is in the closed position of FIG. 2;

FIG. 11 is a view of an alternative aspect of the invention, similar to FIG. 7;

FIG. 12 is an enlarged, partial cross-sectional view of selected components of the alternative aspect of FIG. 11, showing the position of the components when the portable computing device is in the closed position of FIG. 2;

FIG. 22 shows certain portions of FIGS. 2, 3, and 4 in an enlarged view.

DETAILED DESCRIPTION

Figure 1:
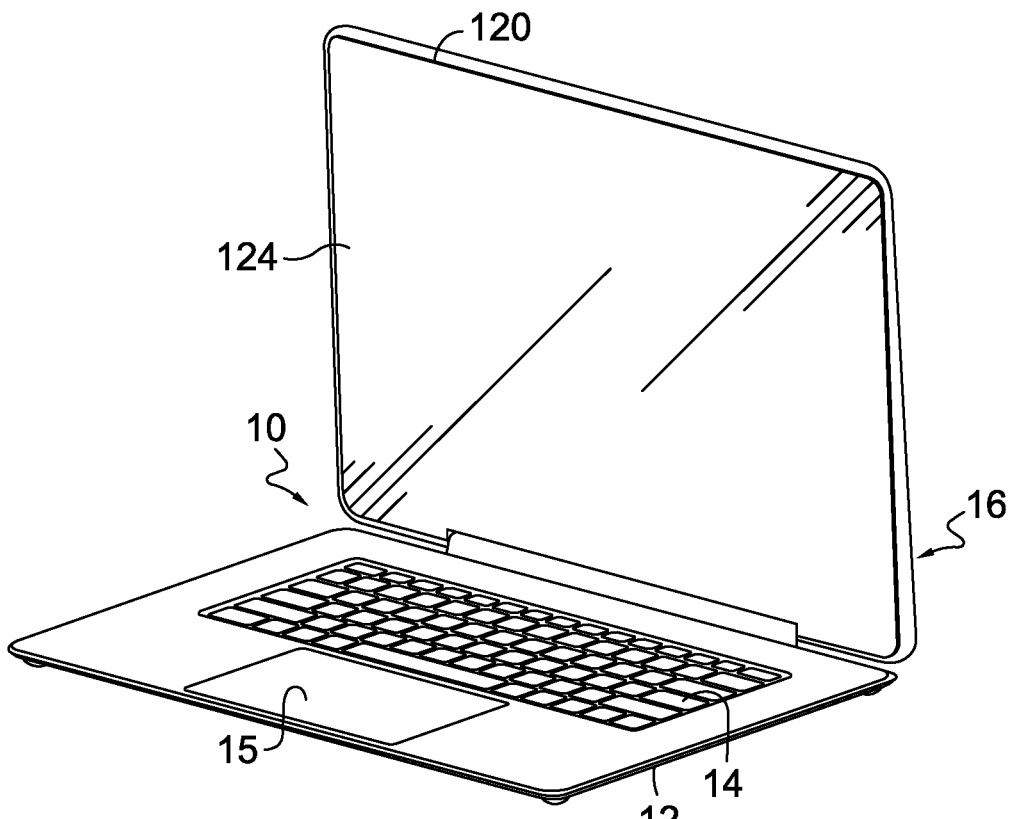
FIG. 1 is a perspective view of a portable computing device with a top shell open to approximately ninety degrees.

A mechanical system is disclosed related to a portable computing device with a moving display. Not all reference numerals are listed on all figures, for clarity, but the same parts numbered in one figure may correspond to similar parts numbered in other figures.

Figure 2:
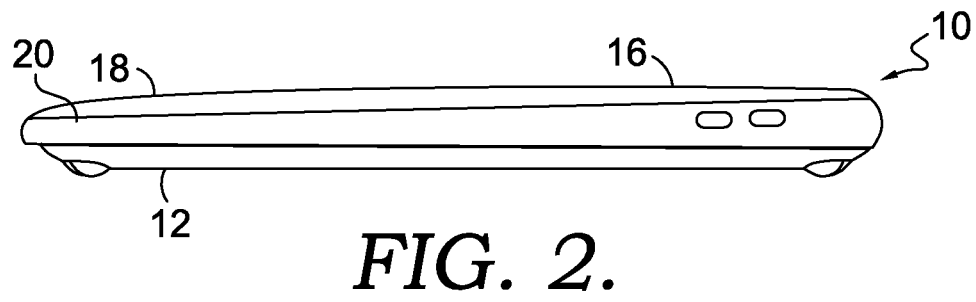
FIG. 2 is a side view of the portable computing device of FIG. 1, shown in a closed position.
Figure 3:
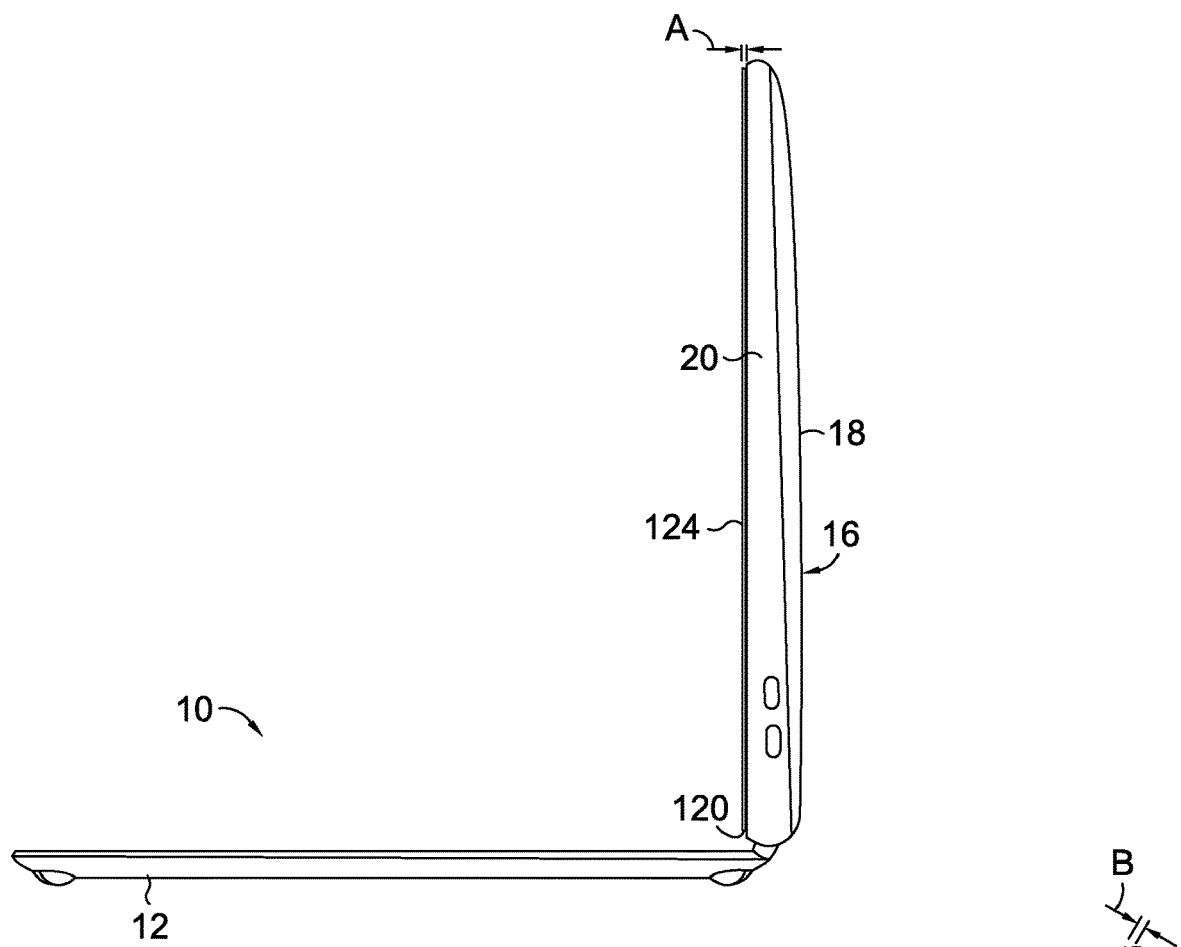
FIG. 3 is a side view of the portable computing device of FIG. 1, with the top shell open to approximately ninety degrees.
Figure 4:
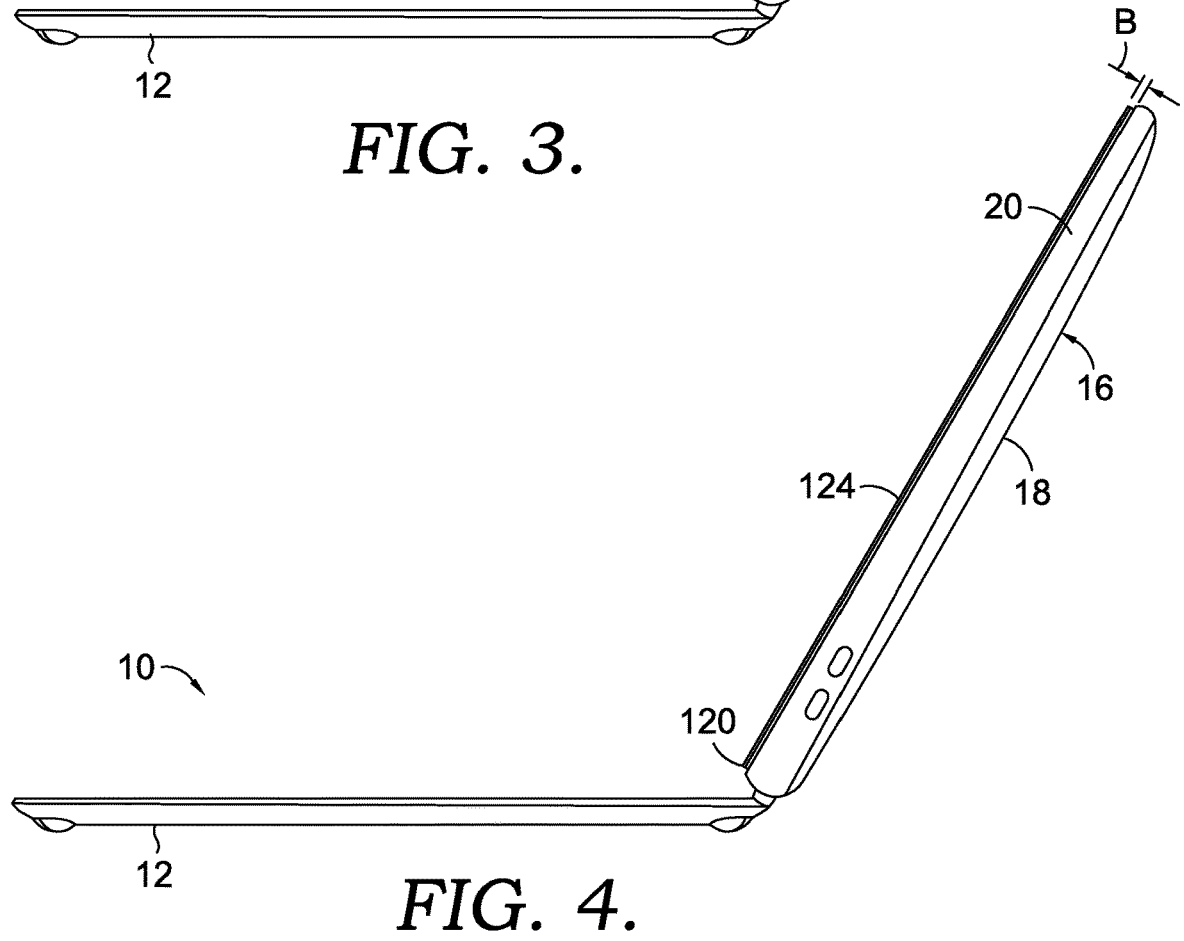
FIG. 4 is a side view similar to FIG. 3, but with the top shell open to approximately one hundred and twenty-five degrees.
Figure 20:
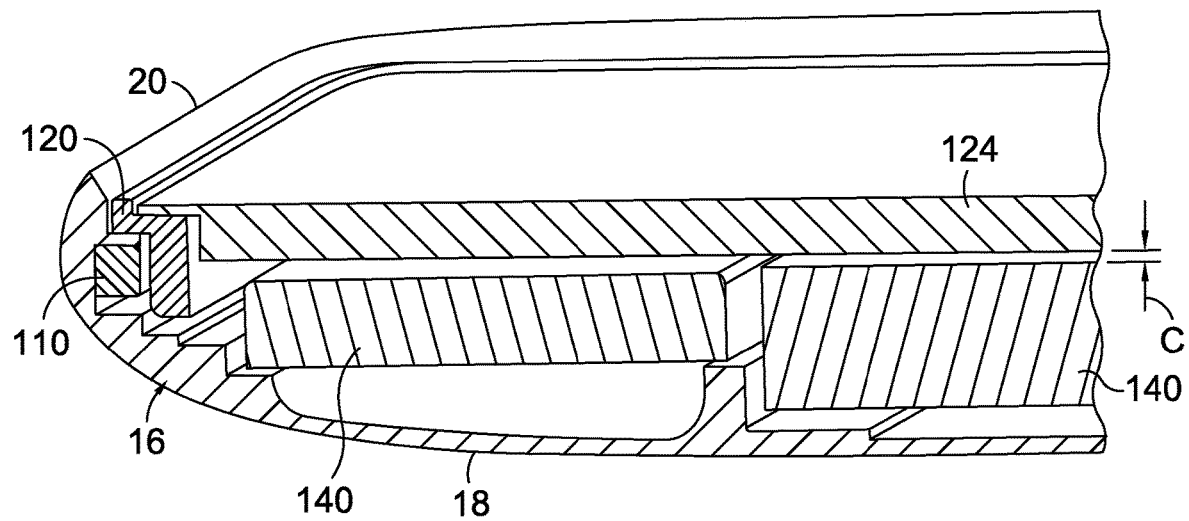
FIG. 20 is a partial cross-sectional view showing the spatial relationship of certain components in the closed position of FIG. 2.
Figure 21:
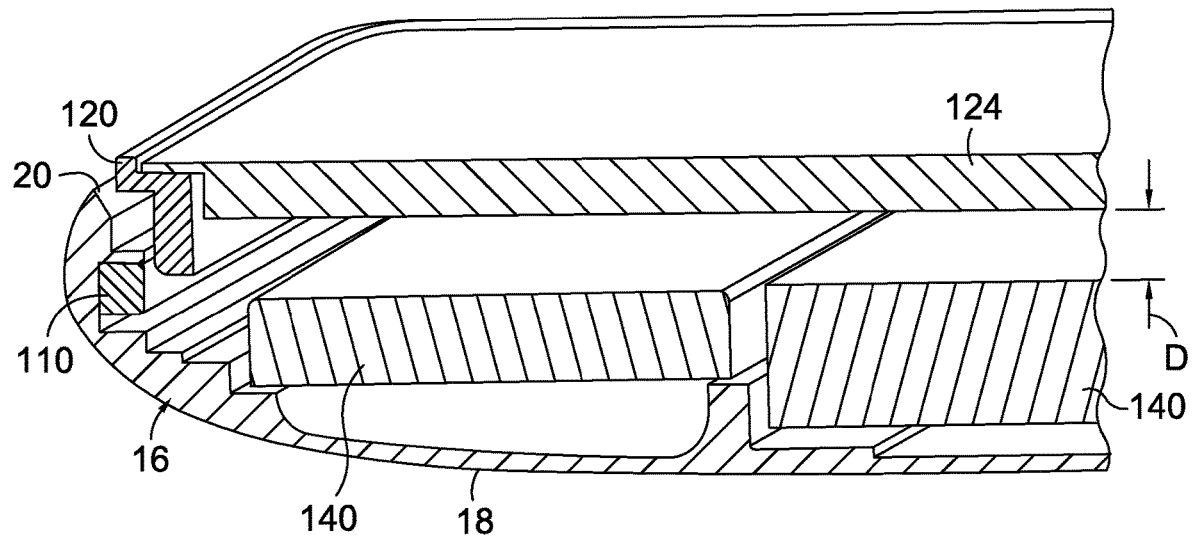
FIG. 21 is a partial cross-sectional view similar to FIG. 20 but showing the spatial relationship of certain components in the open position of FIG. 4.

A portable computing device, such as a laptop, may have a top shell that is pivotally coupled to a bottom shell, allowing the top shell to be moved from a closed position to an open position. The open position may expose a display on the top shell and a keyboard, a trackpad, and/or other input/output components on the bottom shell. A coupling linkage between the bottom shell, the top shell, and the display may operate to move the display outwardly away from the top shell as the top shell is moved to the open position—thereby providing a ventilation gap. As a result, the ventilation gap may protect the display from at least one heat generating component in the top shell when the portable computing device is in use in the open position, but, because the ventilation gap may be closed, or substantially closed, when the top shell is in the closed position, the overall thickness of the portable computing device may be reduced to provide for a slim device when not in use. For example, as shown in FIGS. 2-4, a portable computing device 10 is shown in a closed position in FIG. 2, an open position in FIG. 3 and a further opened position in FIG. 4. As the portable computing device 10 is opened, the display 124 is moved away from the housing of the top shell 16 as shown by letter "A" in FIG. 3 and letter "B" in FIG. 4 (also seen in FIG. 22). When the portable computing device 10 is closed, the display 124 is moved closer to the housing of the top shell 16 so that the distance between the housing and the front of the display 124 is reduced to be less than "A". As a further illustration, FIG. 20 shows the spaced relationship between the display 124 and one or more heat generating components 140 (shown schematically in FIGS. 20 and 21) when in the closed position. A small gap, shown by the letter "C" in FIG. 20 exists between the display 124 and the heat generating components 140 when in the closed position. FIG. 21 shows the spaced relationship between the display 124 and the heat generating components 140 when the portable computing device 10 is in the open position. As shown, the display 124 is moved away from the heat generating components 140, shown by the larger gap labeled by the letter "D" in FIG. 21. A hinge mechanism (as disclosed below) between the top shell 16 and the bottom shell 12 causes the display 124 to move farther or closer to the surface 18 (and thus farther or closer to the heat generating components 140) of the top shell 16 when the portable computing device 10 is opened or closed, respectively. By moving the display 124 away from the housing of the top shell 16 when the computing device 10 is opened, a space is formed between the backside of the display 124 and at least one heat generating component 140 contained within the top shell 16. In one embodiment, the display 124 is moved uniformly away from the housing of the top shell 16 such that the distance between the front of the display 124 and the perimeter rim of the top shell are approximately equal-distant as the display 124 is moved. In another embodiment, the display 124 is moved non-uniformly such that, for example, the distance between the front of the display 124 and the housing of the top shell 16 is greater at locations closer to the hinge connecting the top shell 16 to the bottom shell 12 than at locations farther away from the hinge. As further disclosed below, a hinge mechanism causes the display 124 to be moved (uniformly or non-uniformly) as a user opens the portable computing device 10 to cause a gap to be formed between the display 124 and at least one heat generating component 140 within the top shell 16 without any further intervention by the user to cause the gap to appear.

With reference to FIG. 1, a portable computing device 10 is shown. In one non-limiting aspect, the portable computing device 10 may be a laptop computer. However, in other aspects, and without departing from the scope of the present disclosure, the portable computing device 10 may be another type of computing device, such as a smart phone, a tablet computer, and/or the like. The portable computing device 10 has a bottom shell 12 that can house, in one aspect, a battery (not shown), a keyboard 14, a touchpad 15, and/or other input/output components.

Referring to FIG. 2, portable computing device 10 also includes a top shell 16 that has a surface 18 above which extends to a perimeter rim 20. In some aspects, the bottom shell 12 and the top shell 16 can be made of sturdy, lightweight materials, such as plastic, aluminum, magnesium or carbon fiber, as non-limiting examples. In some aspects, the perimeter rim 20 and the surface 18 of the top shell 16 form a cavity to house various processors (such as a central processing unit (CPU), a graphics processing unit (GPU), etc.), circuitry, and/or other hardware—such as cooling fans or other heat dissipation components (exemplary heat generating components are shown schematically in FIG. 20 and FIG. 21 and labeled as 140).

Figure 15:
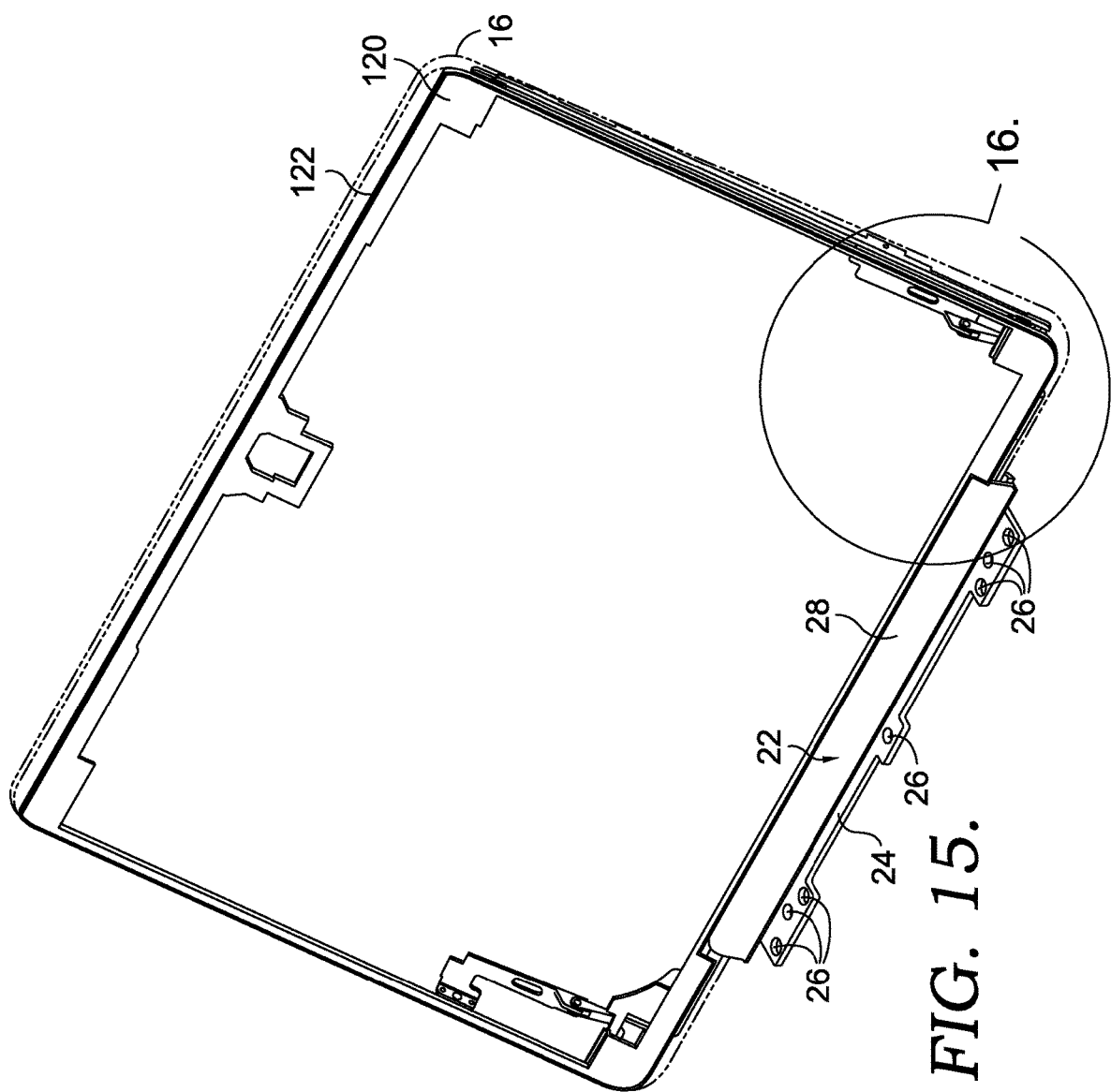
FIG. 15 is a perspective view of the top shell of FIG. 4, with the display removed to show details of construction.
Figure 16:
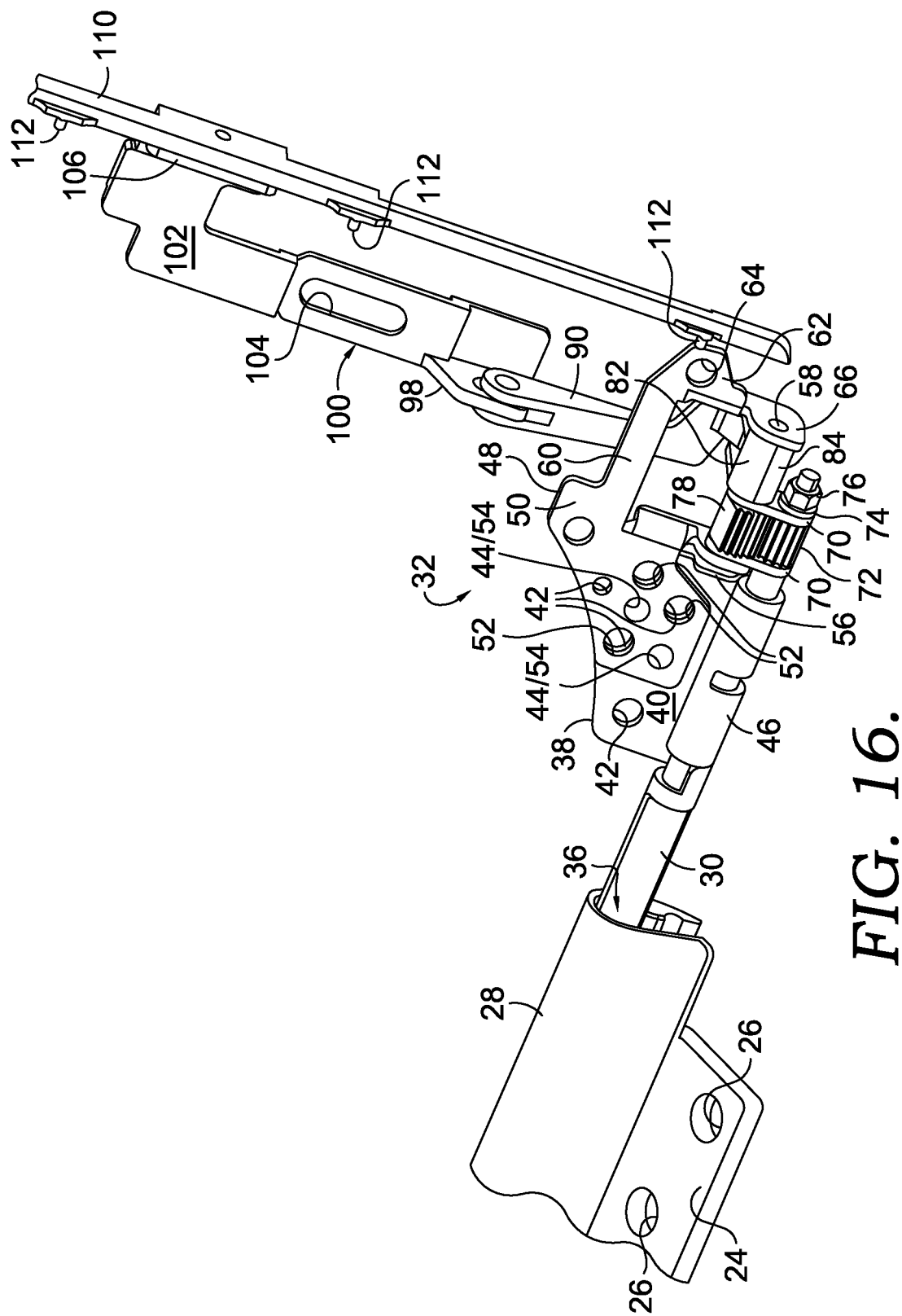
FIG. 16 is an enlarged, partial perspective of the encircled area of FIG. 15, with the display frame and top shell not shown to review further details of construction.

As illustrated in FIG. 15, a center hinge cover 22, with a mounting surface 24, is coupled to the bottom shell 12. This coupling can be, for example, by way of screws placed through mounting holes 26. In this aspect, the bottom shell 12 may have threaded bushings (not shown) to secure the center hinge cover 22 in place, using the mounting holes 26. The center hinge cover 22 also includes a hinge mount section 28 that extends from the mounting surface 24. In some aspects, the center hinge cover 22 has a keyed bore hole in a hinge mount section 28, near each outer edge of the center hinge cover 22. Each keyed bore hole maintains one terminal end of a hinge pin 30, as illustrated in FIG. 16. The hinge pin 30 forms one part of a coupling linkage 32 that couples bottom shell 12, top shell 16 and a display 124 (see FIG. 1) together. The hinge pin 30 forms the apex of the angle between the top shell 16 and the bottom shell 12 when the portable computing device 10 is in the open position. In some aspects, there may be a left hinge pin 30 and a right hinge pin 30 that are essentially mirror images of one another. Moreover, in the following discussion, only one side of the remainder of the coupling linkage 32 is discussed, but applies equally to the opposite, complimentary, side of the coupling linkage 32.

The coupling linkage 32 comprises a plurality of members that are arranged to actuate and control movement of the display 124 during movement of the portable computing device 10 between the closed and (fully) opened positions. Some of these members may be pivotally interconnected. The pivotal couplings (illustrated as pivot points in the figures) between these links can take a variety of configurations, such as, without limitation, pivot pins, shafts, bearings, traditional mounting hardware, rivets, bolt and nut combinations, and/or any other suitable fasteners. Further, the shapes of the described brackets, rails, frames, tabs and other members may vary, as may the locations of certain pivot points. As used herein, when a member or component is referred to as being pivotally "coupled" to, "interconnected" with, "attached" on, etc., another member or component (e.g., link, bracket, frame, and the like), it is contemplated that the members may be in direct contact with each other and/or other elements—such as intervening elements, which may also be present. In one aspect, the components of the coupling linkage 32 are made from a rigid plastic material. However, other lightweight, rigid materials could also be used without departing from the scope of the present disclosure.

With continued reference to FIG. 16, the hinge pin 30 has a terminal end 36 that is maintained in the keyed bore hole of the center hinge cover 22. Each hinge pin 30 extends outwardly from this terminal end, supported by a hinge bracket 38. The hinge bracket 38 includes a mounting surface 40 that, in some aspects, includes screw holes 42 and alignment holes 44. The screw holes 42 are positioned to mate with corresponding threaded bushings in the top shell 16, to secure the hinge bracket 38 in place within the top shell 16. The alignment holes 44 are used to properly position the hinge bracket 38 and a hinge gear support bracket 48 relative to each other and the other components of the coupling linkage 32. Continuing with the hinge bracket 38, a knuckle 46 extends from the mounting surface 40. The knuckle 46 includes a central bore, through which the hinge pin 30 extends, such that the hinge pin 30 is supported by the hinge bracket 38, and is allowed to rotate within the central bore of the knuckle 46.

The hinge gear support bracket 48 has a mounting surface 50 disposed over the mounting surface 40 of the hinge bracket 38. The mounting surface 50 may have screw holes 52, at least some of which may align with the screw holes 42 in the hinge bracket 38. Additionally, the mounting surface 50 may have alignment holes 54 positioned to align with the alignment holes 44 of the hinge bracket 38. As illustrated in FIG. 16, the hinge gear support bracket 48 includes a gear support tab 56 that is oriented generally orthogonally to the mounting surface 50. A gear support tab 56 includes a central hole, through which a shaft 58 extends. The hinge gear support bracket 48 also includes a bridge section 60 that extends outwardly away from mounting surface 50 in a generally coplanar fashion. In some aspects, the hinge gear support bracket 48 includes an extended mounting tab 62 allowing for an additional screw hole 64. Screw holes 52 and 64 are used to couple the hinge gear support bracket 48 to the top shell 16, which has corresponding threaded bushings allowing screws as an attachment mechanism. Other attachment mechanisms could also be used without departing from the scope of the present disclosure. Alignment pins may be placed through alignment holes 44 and 54 to properly align the hinge bracket 38 and the hinge gear support bracket 48 on the top shell 16. The hinge gear support bracket 48 also has a gear support tab 66 that is oriented generally orthogonally to an extended mounting tab 62. The gear support tab 66 includes a central hole, axially aligned with the central hole in the gear support tab 56, and through which the shaft 58 also extends. The shaft 58 thus extends from the gear support tab 56 to the gear support tab 66.

Returning to the hinge 30, outward of the hinge bracket 38, a pair of hinge bars 70 are held on one end on the hinge 30, and on the opposite end are held on the shaft 58. The hinge bars 70 are placed axially on opposite ends of a spur drive gear 72 that is in turn held on the hinge 30. The hinge bars 70 retain the spur drive gear 72 on the hinge 30, and may be further held in place on the hinge 30 with a washer 74 and a nut 76. The hinge bars 70 also operate to retain a spur driven gear 78 on the shaft 58. The spur drive gear 72 has teeth that mate with teeth on the spur driven gear 78 such that as the spur drive gear 72 rotates in one direction, the spur driven gear 78 rotates correspondingly in the opposite direction, the importance of which is described more fully below.

Figure 10:
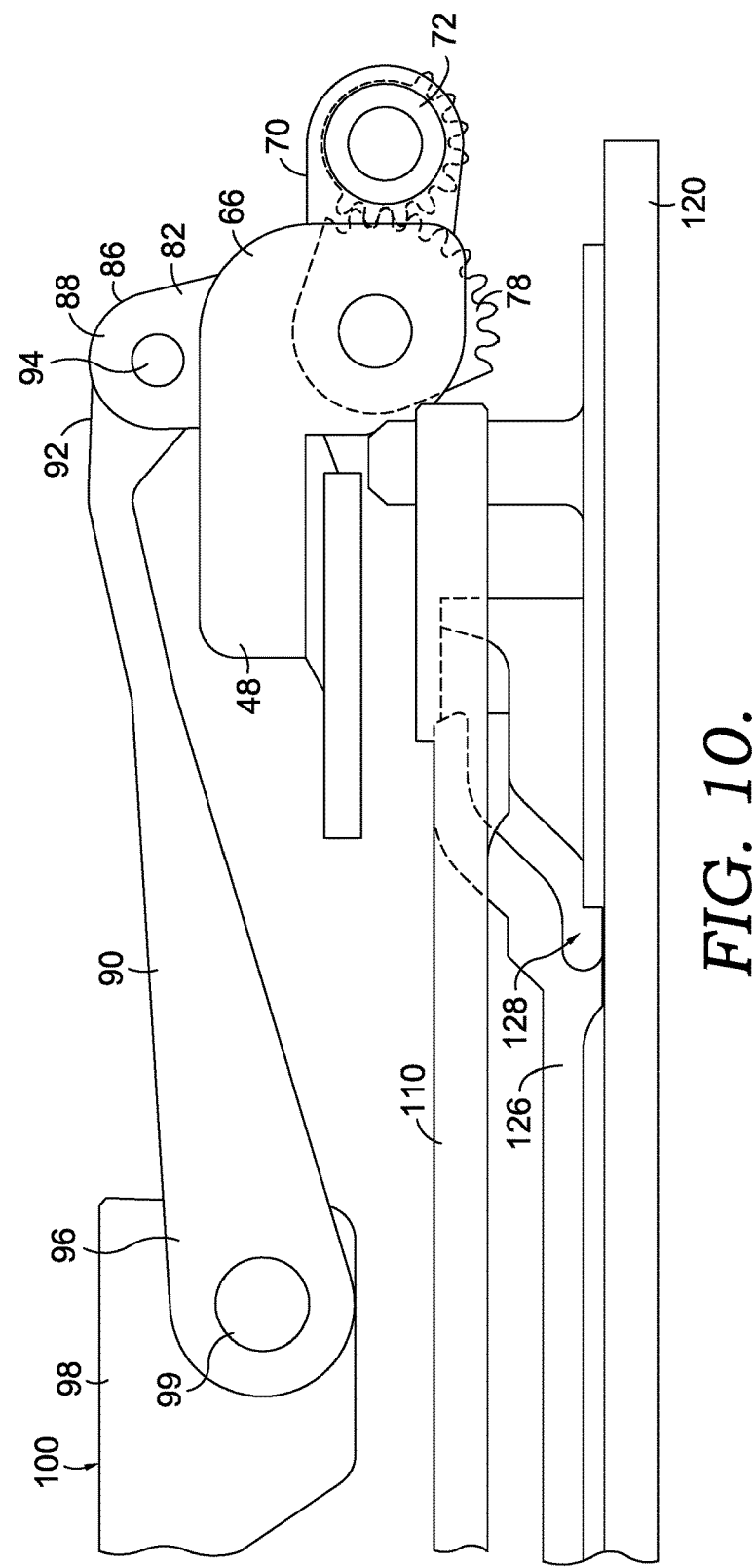
FIG. 10 is view similar to FIG. 8, but showing the position of the components when the portable computing device is in the open position of FIG. 4.
Figure 13:
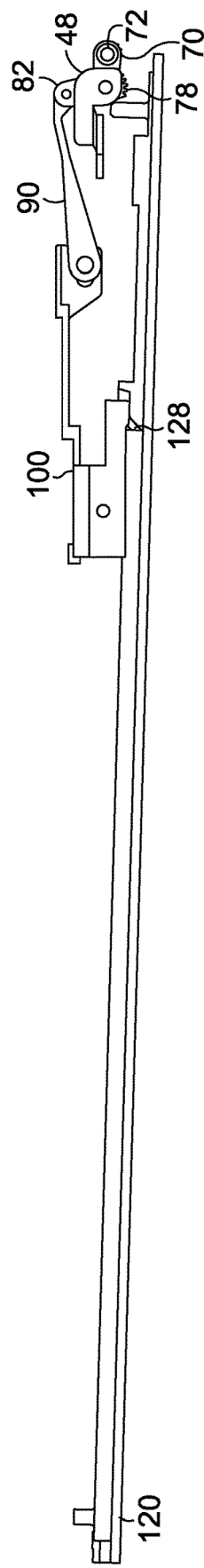
FIG. 13 is a view similar to FIG. 11, but showing the position of the components when the portable computing device is in the open position of FIG. 4.
Figure 14:
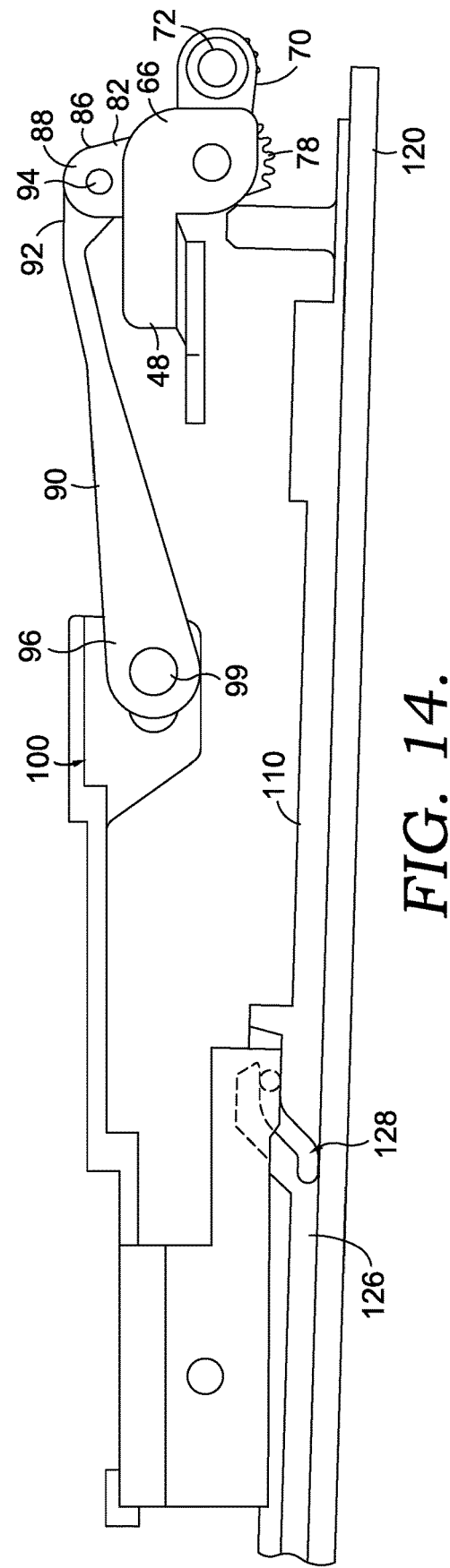
FIG. 14 is view similar to FIG. 12, but showing the position of the components when the portable computing device is in the open position of FIG. 4.

As illustrated in FIG. 16, a pull bracket 82 has a first section 84 that is keyed to the shaft 58, such that the pull bracket 82 rotates as the shaft 58 rotates. The pull bracket 82 also includes a second section 86 (see FIG. 10) that extends away from the first section 82. The second section 86 includes a clevis 88 having a central bore that is parallel to the shaft 58. The second section 86, and specifically the clevis 88, is used to pivotally couple a first end 92 of a hinge link 90 using a shaft 94. The first end 92 of the hinge link 90 is thus pivotally coupled to the pull bracket 82 with the shaft 94. The hinge link 90 extends away from the pull bracket 82 to a second end 96 that forms a clevis. The second end 96 is pivotally coupled to a rear mounting tab 98 of a slider rail 100, with a shaft 99. As illustrated in FIG. 16, the mounting tab 98 extends upwardly and orthogonally from a main arm 102 of the slider rail 100. The main arm 102 is relatively flat, and in some aspects, has an alignment slot 104 formed therein. The alignment slot 104 may be used, along with a screw or pin mounted in the top shell 16, to maintain the position of the slider rail 100 with respect to the top shell 16 and the other components of the coupling linkage 32. The end of slider rail 100 opposite the rear mounting tab 98 has an integral front mounting tab 106 extending upwardly and orthogonally from the main arm 102 in an orientation generally parallel with the rear mounting tab 98. The front mounting tab 106 is attached to a side rail 110, such as, without limitation, with adhesives, screws, pins, or other coupling mechanisms. The side rail 110 extends generally along the side wall of the top shell 16. As illustrated in FIG. 16, the side rail 110 has a number of spaced pins 112 that extend inwardly and that, in some aspects, are integrally formed as part of the side rail 110. The pull bracket 82, the hinge link 90, and the slider rail 100 form a slide linkage that couples the spur driven gear 78 with the side rail 110, such that rotational movement of the spur driven gear 78 is converted into a translational movement of the side rail 110.

As illustrated in FIG. 15, a display frame 120 is shown that, in some aspects, is a one-piece molded part with a perimeter 122 that fits within the perimeter rim 20 of the top shell 16. The display frame 120 is attached to the display 124, as seen in FIG. 1, such as with adhesives or any other known attachment mechanisms. The display 124 is thus attached to display frame 120 such that the display 124 moves as the display frame 120 moves. To that end, as illustrated in FIGS. 6 and 17-19, the display frame 120 has side walls 126 that have a number of cam slots 128 formed therein. In some aspects, the number of cam slots 128 equals the number of pins 112 on the side rail 110. The cam slots 128 are positioned to mate with the pins 112 on the side rail 110. In some aspects, each cam slot 128 has an upper section 130 separated from a lower section 132 by a sloped transition area between the upper section 130 and the lower section 132. Each cam slot 128 also has an open receiving area adjacent the lower section 132. In one aspect, as illustrated in FIG. 6, each cam slot 128 is spaced along the side wall 126 and each cam slot 128 has the same length and slope. The cam slots 128 are used to movably couple the display frame 120 and the display 124 to the side rail 110 and thus to the top shell 16 by placing the pins 112 through the open receiving area and into the cam slots 128.

Figure 9:
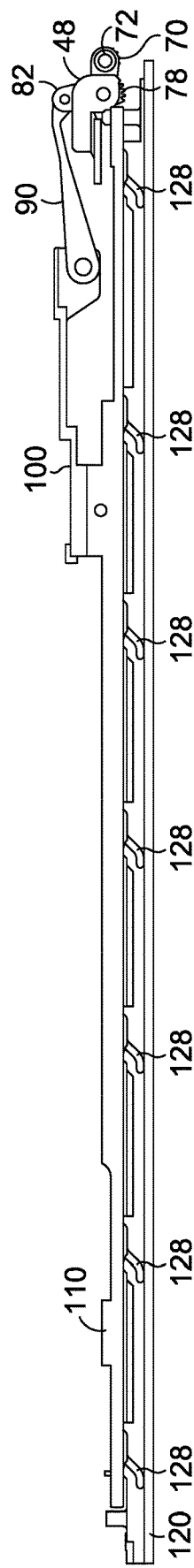
FIG. 9 is a view similar to FIG. 7, but showing the position of the components when the portable computing device is in the open position of FIG. 4.
Figure 17:
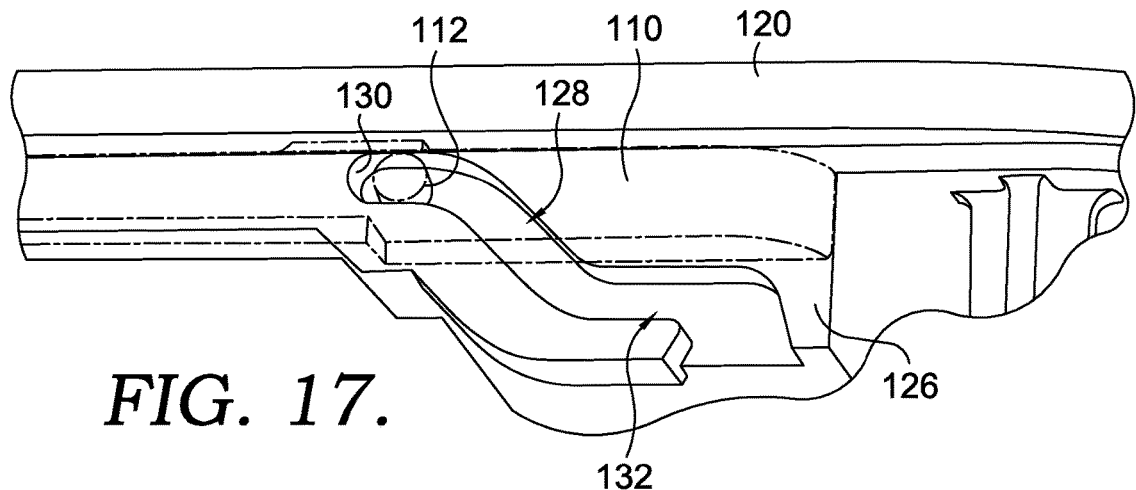
FIG. 17 is an enlarged view showing the relative position of a retaining pin in a cam slot when the portable computing device is in the closed position of FIG. 2.
Figure 18:
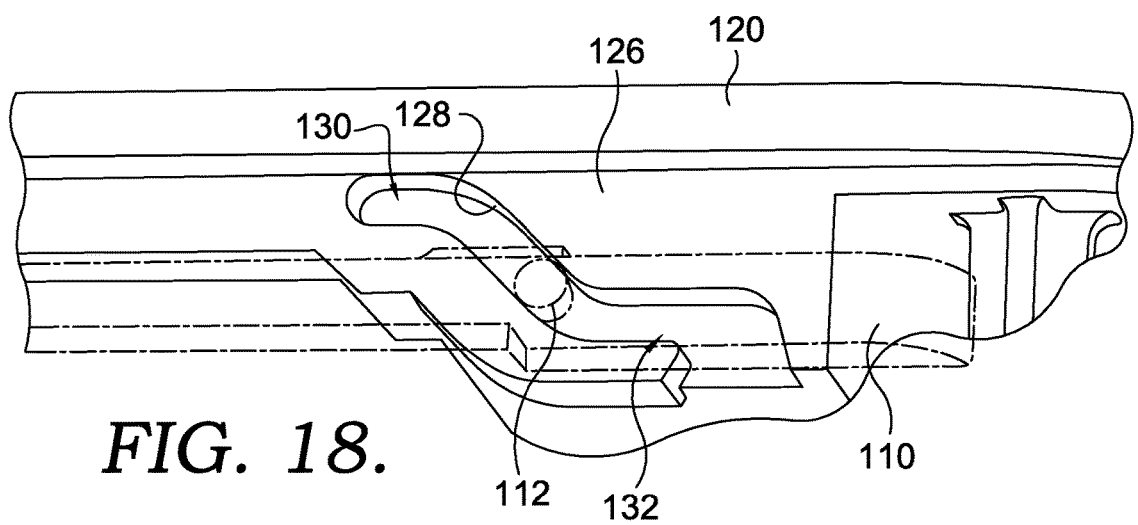
FIG. 18 is a view similar to FIG. 17 but showing the relative position of the retaining pin in the cam slot when the portable computing device is in the partially open position of FIG. 3.
Figure 19:
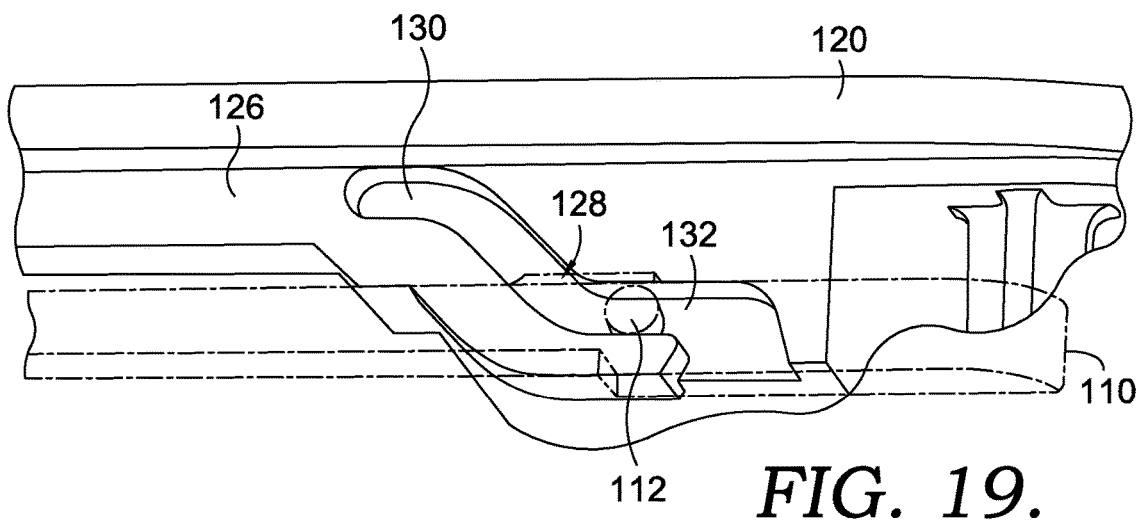
FIG. 19 is a view similar to FIG. 17 but showing the relative position of the retaining pin in the cam slot when the portable computing device is in the open position of FIG. 4.

In use, when the personal computing device 10 is in a closed position, with the top shell 16 adjacent and abutting the bottom shell 12 (as shown in FIG. 2), the pins 112 are located in the upper section 130 of the cam slots 128 (as shown in FIG. 17). As the top shell 16 is moved to an open position, the rotation of the top shell 16 causes the hinges 30 to rotate, supported by the hinge brackets 38. As the hinge 30 rotates, the spur drive gear 72 rotates as well. The rotation of the spur drive gear 72 causes a corresponding counter-rotation of the spur driven gear 78, and thus rotation of the shaft 58. As the shaft 58 rotates, the pull bracket 82 rotates as well from a closed position shown in FIG. 8, to a fully open position shown in FIG. 10. As the pull bracket 82 rotates, the second end 86 pulls on the first end 92 of the hinge link 90, which, in turn, pulls on the slider rail 100. Because the slider rail 100 is attached to the side rail 110, the pulling force is also exerted on the side rail 110, which operates to move the pins 112 within the cam slots 128 from the upper section 130 (FIG. 17) through the transition area (FIG. 18) and into the lower section 132 (FIG. 19). Because the cam slots 128 are defined within the display frame 120, as the pins 112 move within the cam slots 128, the display frame 120 and the display 124 move from the closed position shown in FIG. 2—where the display frame 120 is in-line with the outer perimeter of the top shell 16—to the open position shown in FIGS. 3 and 4. In the open position shown in FIG. 3, a first gap, labeled "A" is created between the display frame 120 and the perimeter rim 20 of the top shell 16. Similarly, in the open position shown in FIG. 4, the above-described opening motion of the top shell 16 moves the display frame 120 and the display 124 outwardly away from the perimeter rim 20 of the top shell 16 to create a second gap, labeled "B", that is greater than the first gap A. This can also be seen with reference to FIG. 22. This provided gap or space between the display 124 and the remainder of the components within the top shell 16 provides space that protects the display 124 from any thermal generating components 140 held within top shell 16. As a further illustration, FIG. 20 shows the spaced relationship between the display 124 and the heat generating components 140 (housed within top shell 16 above the surface 18) when in the closed position. A small gap, shown by the letter "C" in FIG. 20 exists between the display 124 and the heat generating components 140 when in the closed position. FIG. 21 shows the spaced relationship between the display 124 and the heat generating components 140 when the portable computing device 10 is in the open position. As shown, the display 124 is moved away from the heat generating components 140, shown by the larger gap labeled by the letter "D" in FIG. 21. While the cam slots 128 are shown in FIG. 9 as being the same, such that the created gap (A or B) is consistent along the entire side of top shell 16, in an alternative aspect, the slope of the cam slots 128 could vary along the side of top shell 16, from one end to the other, to create a larger gap on one end as compared to the other.

As the top shell 16 is closed, a movement opposite to that described above occurs, and the display frame 120 and the display 124 are returned to a closed position, as shown in FIG. 2, where the display frame 120 and the display 124 are moved toward the perimeter rim 20 of the top shell 16, eliminating the gap as the pins 112 are returned to the upper section 130 of the cam slots 128 by the coupling linkage 32. The created gap (A or B) provides a ventilation flow area to protect the display 124 from any heat generating components 140 when the top shell 16 of the portable computing device 10 is moved to an open position. The created gap (D) provides a ventilation gap between the display 124 and any heat generating components 140 when the top shell 16 of the portable computing device 10 is moved to an open position. In addition, when the top shell 16 of the portable computing device 10 is closed, the coupling linkage 32 moves the display 124 closer to the top shell 16 (closing the ventilation gap (see C in FIG. 20)) to provide a slim overall configuration.

In an additional alternative aspect, as shown in FIGS. 11-14, one end of the display frame 120 may be pivotally coupled to the top shell (such as at the top). The other end of the display frame 120 may be formed with a single cam slot 128 and the coupling linkage 32 couples the display frame 120 to the top shell 16. As the pin moves in the cam slot 128 from the position shown in FIG. 12 to the position shown in FIG. 14, the end of the display frame 120 coupled at the coupling linkage end moves away from the top shell 16. In this aspect, the created gap varies along the top shell 16 from the pivotal connection (no gap) to the end with the coupling linkage 32 (largest gap). Such an alternative aspect may be used, for example, if the majority of the heat generating components are primarily at one end of the top shell 16.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies.

What is claimed is:

1. A portable computing device, comprising:
    a bottom shell;
    a top shell having a generally planar surface and a perimeter rim extending from the surface, the surface and the perimeter rim defining a cavity, the top shell pivotally coupled to the bottom shell for movement between a closed position with the perimeter rim adjacent to the bottom shell and at least one open position where a portion of the perimeter rim is distal from the bottom shell;
    a display fitting within the perimeter rim of the top shell, the display being disposed within the cavity and obscured from view when the top shell is in the closed position and the display being viewable when the top shell is in the at least one open position; and
    a coupling linkage coupling the display, the top shell, and the bottom shell, the coupling linkage adapted to move the display between at least a first position with the display closer to the surface of the top shell when the top shell is in the closed position and a second position with at least a portion of the display farther from the surface of the top shell when the top shell is in the open position.

2. A portable computing device, comprising:
    a bottom shell;
    a top shell having a generally planar surface and a perimeter rim extending from the surface, the surface and the perimeter rim defining a cavity, the top shell pivotally coupled to the bottom shell for movement between a closed position with the perimeter rim adjacent to the bottom shell and at least one open position where a portion of the perimeter rim is distal from the bottom shell;

a display adjacent to the top shell, the display being obscured from view when the top shell is in the closed position and the display being viewable when the top shell is in the at least one open position;

a coupling linkage coupling the display, the top shell, and the bottom shell, the coupling linkage adapted to move the display between at least a first position with the display closer to the surface of the top shell when the top shell is in the closed position and a second position with at least a portion of the display farther from the surface of the top shell when the top shell is in the open position;

a display frame coupled to the display, the display frame including a pair of spaced apart sidewalls, each sidewall defining at least one cam slot; and wherein the coupling linkage comprises a pair of spaced apart side rails, adjacent the sidewalls of the display frame, the side rails including at least one pin extending into the at least one cam slot;

wherein the coupling linkage translates the at least one pin within the at least one cam slot as the top shell is rotated from the closed position to the at least one open position, moving the display from the first position to the second position.

3. The portable computing device of claim 2, wherein each display frame sidewall defines a plurality of spaced apart cam slots, and wherein each side rail includes a corresponding plurality of spaced apart pins, each pin extending into a corresponding cam slot.

4. The portable computing device of claim 3, wherein each of the plurality of spaced apart cam slots has the same configuration, such that a plane formed by the display in the first position is parallel to a plane formed by the display in the second position.

5. The portable computing device of claim 3, wherein each of the plurality of spaced apart cam slots has a slope that varies along the sidewall, such that a plane formed by the display in the first position is not parallel to a plane formed by the display in the second position.

6. The portable computing device of claim 2, wherein the at least one cam slot has an upper section separated from a lower section by a sloped transition area, and wherein the coupling linkage moves the pin from the upper section when the top shell is in the closed position to the lower section when the top shell is moved to the open position.

7. The portable computing device of claim 6, wherein the coupling linkage further comprises:

at least one hinge pin coupled to the top shell such that the hinge pin rotates as the top shell moves between the closed position and the open position;

at least one drive gear coupled to the hinge pin that rotates as the hinge pin rotates;

at least one driven gear mating with the at least one drive gear; and a slide linkage coupling the at least one driven gear and the side rail, the slide linkage converting rotational movement of the at least one driven gear into translational movement of the side rail.

8. The portable computing device of claim 7, wherein the slide linkage comprises:

a pull bracket having a first end fixedly coupled to the at least one driven gear such that the pull bracket rotates as the at least one driven gear rotates, and a second end distal from the first end;

a hinge link pivotally coupled on one end to the second end of the pull bracket, the hinge link extending away from the pull bracket; and a slider rail pivotally coupled to the end of the hinge link distal from the pull bracket and fixedly coupled to the side rail, wherein rotation of the at least one driven gear rotates the pull bracket and translates the slider rail and side rail.

9. The portable computing device of claim 1, wherein in the second position, a gap is formed between the display and the surface of the top shell.

10. A laptop computer, comprising:

a bottom shell;

a top shell;

a hinge pivotally coupling the top shell to the bottom shell, the hinge facilitating movement of the top shell between a closed position directly over the bottom shell and an open position with the hinge at the apex of an angle formed by the top shell and the bottom shell;

a display within the top shell; and a coupling linkage disposed between and directly coupling the hinge and the display, the coupling linkage moving the display outward with respect to the top shell as the top shell moves between the closed position and the open position.

11. A laptop computer, comprising:

a bottom shell;

a top shell having a surface and a perimeter rim extending from the surface, the surface and the perimeter rim forming a cavity for computing components;

a hinge pivotally coupling the top shell to the bottom shell, the hinge facilitating movement of the top shell between a closed position directly over the bottom shell and an open position with the hinge at the apex of an angle formed by the top shell and the bottom shell;

a display within the top shell; and a coupling linkage disposed between the hinge and the display, the coupling linkage moving the display outward with respect to the top shell as the top shell moves between the closed position and the open position;

a display frame coupled to the display, the display frame including a pair of spaced apart sidewalls, each sidewall defining at least one cam slot; and wherein the coupling linkage comprises a pair of spaced apart side rails, adjacent the sidewalls of the display frame, the side rails including at least one pin extending into the at least one cam slot;

wherein the coupling linkage translates the at least one pin within the at least one cam slot as the top shell is rotated from the closed position to the open position, moving the display from a first position with the display substantially within the same plane as a plane formed by the upper-most portion of the perimeter rim of the top shell, when the top shell is in the closed position, to a second position with at least a portion of the display moved outwardly away from the plane formed by the upper-most portion of the perimeter rim of the top shell, forming a gap between the at least a portion of the display and the top shell.

12. The laptop of claim 11, wherein each display frame sidewall defines a plurality of spaced apart cam slots, and wherein each side rail includes a corresponding plurality of spaced apart pins, each pin extending into a corresponding cam slot.

13. The laptop of claim 12, wherein each of the plurality of spaced apart cam slots has the same configuration, such that a plane formed by the display in the first position is parallel to a plane formed by the display in the second position.

14. The laptop claim 12, wherein each of the plurality of spaced apart cam slots has a slope that varies along the sidewall, such that a plane formed by the display in the first position is not parallel to a plane formed by the display in the second position.

15. The laptop of claim 11, wherein the coupling linkage further comprises:
at least one hinge pin coupled to the top shell such that the hinge pin rotates as the top shell moves between the closed position and the open position;
at least one drive gear coupled to the hinge pin that rotates as the hinge pin rotates;
at least one driven gear mating with the at least one drive gear; and
a slide linkage coupling the at least one driven gear and the side rail, the slide linkage converting rotational movement of the at least one driven gear into translational movement of the side rail.

16. The laptop of claim 15, wherein the slide linkage comprises:
a pull bracket having a first end fixedly coupled to the at least one driven gear such that the pull bracket rotates as the at least one driven gear rotates, and a second end distal from the first end;
a hinge link pivotally coupled on one end to the second end of the pull bracket, the hinge link extending away from the pull bracket; and
a slider rail pivotally coupled to the end of the hinge link distal from the pull bracket and fixedly coupled to the side rail,
wherein rotation of the at least one driven gear rotates the pull bracket and translates the slider rail and side rail.

17. A coupling linkage for a portable computing device to moveably couple a display of the portable computing device to a top shell of the portable computing device, the top shell moveable between a closed position and an open position, the coupling linkage comprising:
a display frame coupled to the display, the display frame including a pair of spaced apart sidewalls, each sidewall defining at least one cam slot; and
a pair of spaced apart side rails, adjacent the sidewalls of the display frame, the side rails including at least one pin extending into the at least one cam slot;
at least one hinge pin coupled to the top shell such that the hinge pin rotates as the top shell moves between the closed position and the open position;
at least one drive gear coupled to the hinge pin that rotates as the hinge pin rotates;
at least one driven gear mating with the at least one drive gear; and
a slide linkage coupling the at least one driven gear to one of the side rails, the slide linkage converting rotational movement of the at least one driven gear into translational movement of the side rail,
wherein the translational movement of the side rail translates the at least one pin within the at least one cam slot as the top shell is rotated from the closed position to the open position, moving the display from a first position nearer the top shell to a second position with the display moved further from the top shell, forming a gap between the display and the top shell.

18. The coupling linkage of claim 17, wherein the slide linkage comprises:
a pull bracket having a first end fixedly coupled to the at least one driven gear such that the pull bracket rotates as the at least one driven gear rotates, and a second end distal from the first end;
a hinge link pivotally coupled on one end to the second end of the pull bracket, the hinge link extending away from the pull bracket; and
a slider rail pivotally coupled to the end of the hinge link distal from the pull bracket and fixedly coupled to the side rail,
wherein rotation of the at least one driven gear rotates the pull bracket and translates the slider rail and side rail.

19. The coupling linkage of claim 18, wherein each of the plurality of spaced apart cam slots has the same configuration, such that a plane formed by the display in the first position is parallel to a plane formed by the display in the second position.

20. The coupling linkage of claim 19, wherein each of the plurality of spaced apart cam slots has a slope that varies along the sidewall, such that a plane formed by the display in the first position is not parallel to a plane formed by the display in the second position.

* * * * *